Oct. 20, 1936.  L. J. BINDER  2,057,760
MOTOR VEHICLE SIGNAL
Filed March 27, 1934
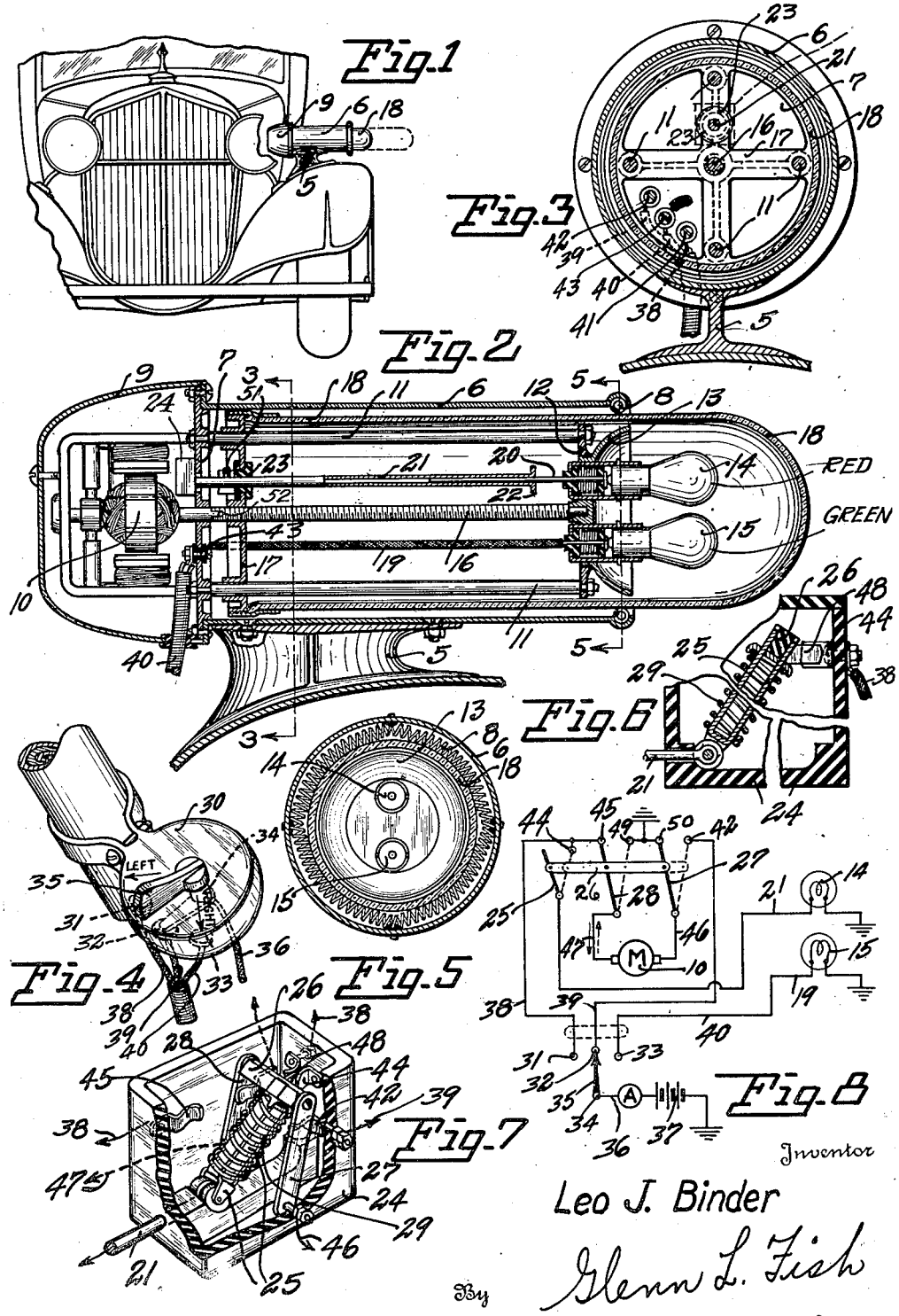
Inventor
Leo J. Binder
By Glenn L. Fish
Attorney Patented Oct. 20, 1936

2,057,760

UNITED STATES PATENT OFFICE 2,057,760

MOTOR VEHICLE SIGNAL

Leo J. Binder, Spokane, Wash.

Application March 27, 1934, Serial No. 717,579

3 Claims. (Cl. 177—327)

My invention relates to motor vehicle signals and more particularly to a signal that is arranged and adapted to indicate the direction in which a vehicle will turn. The principal objects of the invention are to provide a signal for indicating directions in which it is intended to turn a vehicle and which comprises a device that is simple and comparatively inexpensive in construction, which is neat and ornamental in appearance, which is efficient and direct acting in operation, and which is operated by simply turning a switch.

With these and other objects in view, the invention consists of the novel construction, adaptation, combination and arrangement of parts hereinafter described and claimed. These objects are accomplished by devices illustrated in the accompanying drawing; wherein:

Figure 1 is a view in front elevation of a motor vehicle showing my signaling device mounted on one fender thereof; Fig. 2 is an enlarged view in longitudinal vertical section; Fig. 3 is a view in transverse vertical section taken on a broken line 3—3 of Fig. 2; Fig. 4 is a detail view in perspective of the manual control switch; Fig. 5 is a view in transverse vertical section taken on a broken line 5—5 of Fig. 2; Fig. 6 is a view in longitudinal vertical section of the operating switch; Fig. 7 is a view in perspective of the same with parts broken away; and Fig. 8 is a wiring diagram.

Referring to the drawing throughout which like reference numerals indicate like parts, the numeral 5 designates a base bracket which may be mounted upon a fender or other forward part of a motor vehicle as shown in Fig. 1. Said bracket supports a cylindrical casing 6. The operating end of said casing is closed by a plate 7, while its projecting end is provided with an internal transverse groove having a coiled annular spring 8 mounted therein for reasons presently set forth. A cup-like housing 9 is bolted or otherwise secured to the rear side of the plate 7, and a motor 10 is mounted within said housing in any desired manner.

Four guide rods, designated by the numeral 11, are connected to the closure plate 7 in equally spaced apart relation and extend longitudinally within the cylindrical casing 6 nearly to its remote end where a ring plate 12 is fixed to the ends of said rods. Centrally threaded into said ring plate is a reflector 13 and electric globes 14 and 15 are socketed through said reflector. For the purpose of illustration, only two globes are shown, and the globe 14 may be red while the globe 15 may be green. It will be understood that any number of globes of any desired colors may be used. A worm shaft 16 has one of its ends connected to the shaft of the motor 10 and its other end centrally journaled in the reflector 13.

A skeleton disc 17 is slidably mounted on the rods 11 and the worm shaft 16 extends through the disc causing it to travel back and forth when the motor 10 is in operation. A translucent glass tube 18 has its open end connected to the disc 17 by means of a ferrule and rubber cement or any other desired means making a tight shatter proof connection. The closed end of said glass tube extends outwardly to envelope the globes 14 and 15 and engages the annular coiled spring 8 which serves as a cushion and vibration absorber for the glass tube. It will be apparent that, upon rotation of the motor, the skeleton disc 17 will move the translucent glass tube outwardly to the dotted position shown in Fig. 1 thus greatly enlarging the field of light.

Current is supplied to the green globe 15 by means of a cable 19 passing insulatively through the closure plate 7. Current is supplied to the red globe 14 by means of a thin rod 20 slidably extending into a small tube 21. This small tube has a flange 22 on its end adjacent the globe 14, and its other end extends slidably through an insulator bushing 23 mounted on the skeleton disc 17 to a connection with an operating switch 24 mounted within the housing 9 and which will presently be described. When the disc 17 is at the outward limit of its movement it carries the bushing 23 into engagement with the flange 22 of the tube 21 causing sufficient slidable movement of said tube to throw the operating switch as hereinafter described.

The tube 21 extends into the housing of the operating switch 24 which is shown in detail in Figs. 6 and 7 of the drawing. It being the present intention to embody the switch means of this device in a separate patent application and it being understood that the device is not limited to the precise switch means herein shown, only a sufficient description of the switch mechanism will be made herein to convey the mode of operation of the device as a whole. Within the casing of the switch 24, the tube 21 is pivotally connected to the lower end of a bifurcated member 25 where anti-friction rollers support said member on the floor of the switch casing. The two arms of said bifurcated member extend upwardly to a slidable connection with an insulator cross bar 26 carrying knife blade switch members 27 and 28 at its respective ends the lower ends of which are pivotally connected to the switch casing. A coiled spring 29 is mounted on the bifurcated member 25, being interposed between its lower end and the insulator cross bar, so that, when the lower end of the bifurcated member is moved beyond the vertical position, said spring will cause said member to snap over to the alternate positions as will be understood.

In Fig. 4 of the drawing I have shown the manual control switch 30 which may be mounted on the steering post of the vehicle. This is a single pole, triple throw switch comprising the three contacts 31, 32 and 33 and the central pole 34. A lever 35, that is connected to the central pole, swingingly engages said contacts, and a wire 36 leads from the central pole to the battery 37 of the vehicle shown in Fig. 8. Wires 38 and 39 and 40, connecting respectively with the contacts 31, 32, and 33, run to connecting posts 41, 42, and 43 on the closure plate 7. Here the wire 40 connects with the wire 19 running to the green light 15. The wire 39 connects to the post 42. The wire 38 runs to switch terminals 44 and 45 on the operating switch 24. The knife switch members 27 and 28 are respectively connected with the motor 10 by wires 46 and 47. The current from the operating switch passes through a small projection 48 on the bifurcated member 25 to the terminal 44, over one of the wires 38 to the post 41 where it connects with the tube 21 and thence over the rod 20 to the red light 14. Terminals 49 and 50, shown in Fig. 8 and not shown in Fig. 7, are connected to the ground.

Assuming that the switch lever 35 is in the central or neutral position and engaging the contact 32, as shown in Fig. 4, the operation of the device is as follows. When it is desired to signal that a left turn of the vehicle will be made, said switch lever is moved to the left into engagement with the contact 31. Current will flow from the battery 37, through wire 36, lever 35, wire 38, switch terminal 45 of switch 24, knife switch blade member 28 and wire 47 (in the direction shown by full line arrow in Fig. 8) through the motor 10, thence through wire 46, knife switch blade 27, and terminal 50 to the ground and hence back to the battery 37 thus completing the circuit, the switch 24 being in the position shown in full lines in Fig. 8. The motor 10 will be set in operation, revolving the worm shaft 16, moving the disc 17 and the translucent glass tube 18 to the outward dotted position shown in Fig. 1.

Upon the disc 17 reaching the outward position, its insulator bushing 23 will strike the flange 22 thus pulling the tube 21 outward and throwing the switch 24 to the position shown in Figs. 6 and 7 and in dotted lines in Fig. 8. The projection 48 on the bifurcated member 25 will engage the terminal 44 of said switch whereby current will flow through tube 21 and rod 20 to the red globe 14 and thence to the ground. The extended translucent glass tube 18, now illuminated by the red globe and visible in all necessary directions, gives ample warning that a left turn is to be made. After the turn has been completed, the switch lever 35 is manually returned to the central or neutral position and current will again flow from the battery 37, through wire 36, switch lever 35, wire 39, terminal 42 of switch 24, knife switch member 27, wire 46, motor 10 in the reverse direction, wire 47 (as shown by the dotted arrow in Fig. 8), knife switch member 28 to the terminal 49 thence to the ground thus completing the circuit.

The reverse flow of the current, of course, causes the motor 10 and the worm shaft 16 to rotate in the opposite direction thus returning the glass tube 18 and the disc 17 to their inward normal positions. The insulator bushing 23, carried by said disc, will be caused to strike a collar 51 fixed on the tube 21 causing said tube to move back sufficiently to throw the switch 24 back to its normal position as shown in full lines in Fig. 8, thus breaking the circuit to the motor and shutting it off, and also breaking the circuit to the red light and turning it out. The worm shaft 16 is connected to the motor shaft at 52.

If it is desired to signal that a right turn of the vehicle will be made, the switch lever 35 is manually moved to the right into engagement with the contact 33 and current will flow from the battery 37 over wires 36 and 40 through the green globe 15 to the ground. When the turn is completed the switch lever 35 is returned to the neutral position thus breaking the light circuit and turning out the green globe. In signaling the right turn, it will be noted that the glass tube 18 remains in the retracted position, and it will be understood that the range of vision need not be so great in signaling a right turn.

Having thus described my invention, what I claim and desire to secure by Letters Patent of the United States is:—

1. A motor vehicle signal comprising a cylindrical casing closed at one of its ends, a housing connected to the closed end, a reflector mounted within the open end, light globes socketed into the reflector, guide rods fixed to and extending from the closed end of the casing to the reflector and supporting the reflector, a motor mounted within the housing and having a shaft extending through the closed end of the casing, a screw shaft connected to the motor shaft and extending longitudinally through the casing to a journaled connection with the reflector, a tube mounted within the casing and having a closed end normally projecting exteriorly of said casing and enveloping the reflector, an annular coiled spring mounted in the open end of the casing and supporting said tube, a disc fixed to and closing the inner end of said tube and slidably mounted on the guide rods, and said disc having a threaded hole engaged by the screw shaft whereby said tube is caused to move longitudinally with respect to the cylindrical casing upon rotation of the motor.

2. A motor vehicle signal comprising a cylindrical casing having a closed and an open end, an end compartment connected to the closed end, a reflector mounted within the open end, a pair of light globes socketed into the reflector, guide rods fixed to and extending from the closed end of the casing and supporting the reflector, a motor mounted within the end compartment and having a shaft extending through the closed end of the casing, a screw shaft connected to the motor shaft and extending to a journaled connection with the reflector, a tube mounted within the casing and having a closed end portion normally projecting exteriorly of the open end of the casing and enveloping the reflector, a coiled annular spring mounted in the open end of the casing and supporting the projecting end of the tube, a disc fixed to and closing the inner end of the tube and slidably mounted on the guide rods, said disc having a threaded hole engaged by the screw shaft whereby the disc and its attached tube are caused to move outwardly from the casing upon rotation of the motor, an electric circuit connecting the motor and one of the light globes, a manual control switch for directing current through said motor and light globe, an operating switch interposed in the circuit between said motor and globe and arranged to reverse the direction of current through the circuit, a slidable trip mechanism connected to the operating switch and forming the portion of the circuit between said operating switch and light globe, a flanged shoulder on the outer end of said trip mechanism arranged to be engaged by the disc at the limit of its outward movement whereby the operating switch is caused to reverse the direction of current through the motor and the tube is caused to move inwardly, and a collar fixed to the inner end portion of the trip mechanism and arranged to be engaged by the disc at the limit of its inward movement whereby the circuit to the motor and globe is broken.

3. A motor vehicle signal comprising a casing, a motor mounted in one end of the casing and having a screw shaft extending longitudinally thereof, a reflector mounted in the other end of the casing, a pair of light globes socketed into the reflector, a tube mounted for longitudinal movement within the casing with its outer closed end enveloping the reflector, and its inner end closed by a disc, said disc threadedly engaged by the screw shaft whereby same is caused to move outwardly upon rotation of the motor, a circuit connecting the motor and one of the light globes, switch means interposed in the circuit for controlling the direction of current through said motor and globe, trip means connected to the disc for actuating the switch means and thereby reversing the direction of current through the motor at the outward limit of the movement of the tube whereby said tube is caused to move inwardly, means connected to said tube for breaking said circuit at the limit of the inward movement of the tube, a circuit for the other light globe, and manual means for making and breaking said last named circuit.

LEO J. BINDER.